Sept. 13, 1966   S. A. BLACK   3,272,677
INFLATABLE ANNULAR BLADDER USED TO FORM THE BEAD
REGION OF A PNEUMATIC TIRE CARCASS
Filed Dec. 4, 1962   2 Sheets-Sheet 1
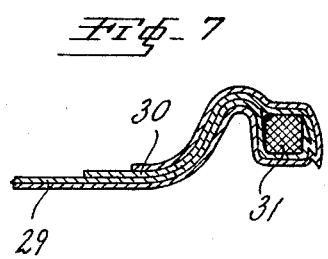
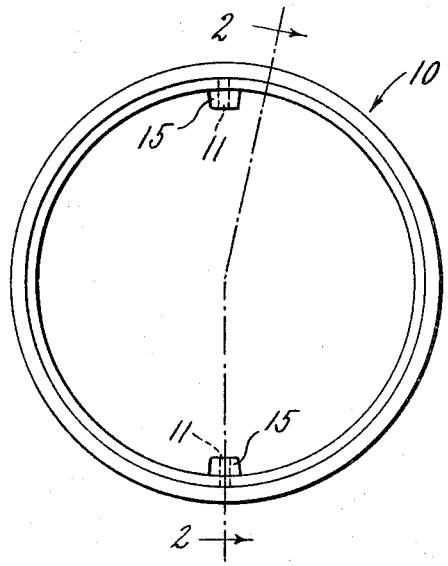
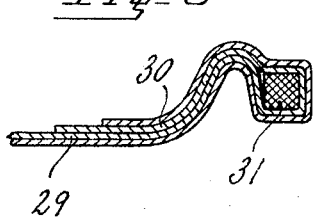
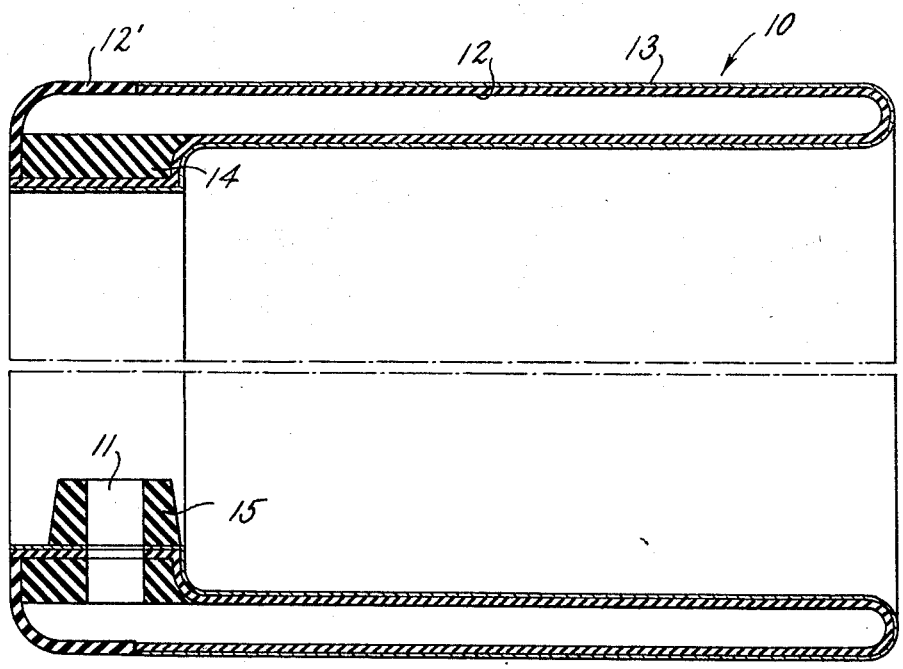
INVENTOR.
SHEPPARD A. BLACK
BY
Harvey E Bumgardner Jr.
ATTORNEY

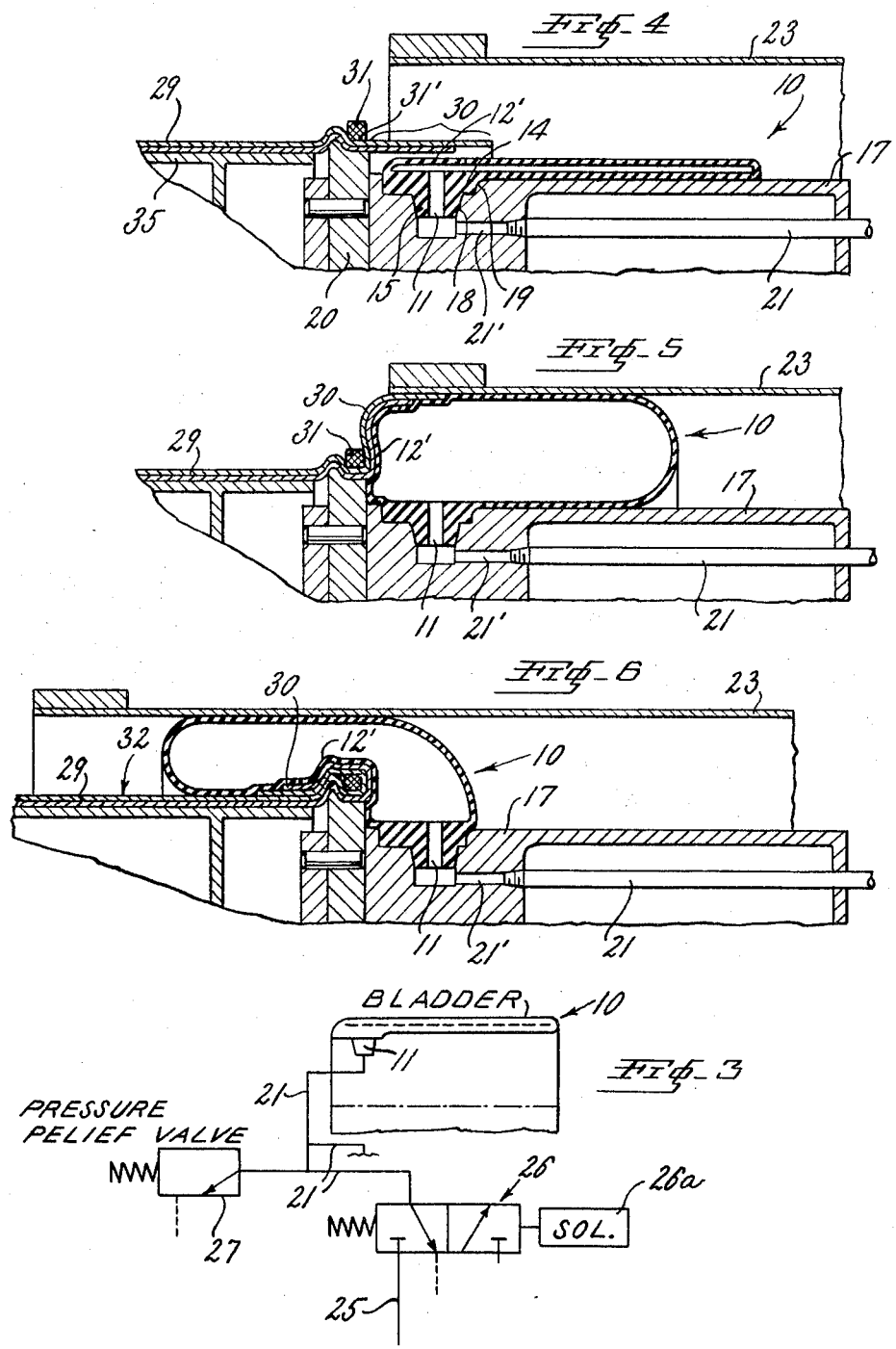

United States Patent Office 3,272,677
Patented Sept. 13, 1966

3,272,677
INFLATABLE ANNULAR BLADDER USED TO FORM THE BEAD REGION OF A PNEUMATIC TIRE CARCASS
Sheppard A. Black, Wayne, N.J., assignor to United States Rubber Company, New York, N.Y., a corporation of New Jersey
Filed Dec. 4, 1962, Ser. No. 242,288
8 Claims. (Cl. 156—401)

This application relates to an improved apparatus for enfolding each end of a ply band about a bead wire bundle and adhering each said enfolded end to said ply band to form a carcass for a pneumatic tire.

More specifically, it relates to an inflatable ply turn-up bladder of improved construction.

It has generally been the practice to build carcasses by forming a ply band comprised of two or more bias cut or bias wound sheets of fabric on a generally cylindrical tire forming drum, providing a shoulder at each bead region of said ply band either by turning the ply ends down about the end of the drum or a shoulder provided thereon, or by expanding the central portion of the drum, "setting" or placing bead wire bundles or "beads" in contact with the shoulders so formed in such a manner that one face of the bead oriented perpendicular to the axis of the bead is in contact with the axially perpendicular shoulder face of the band with the ply ends extending through and beyond the bead and spaced from the radially interior surface thereof, and, thereafter, first expanding said ply ends into contact with the radially interior bead surface and then smoothly enfolding the ply ends about the bead and adhering said ends to the ply band, thereby forming a tire carcass.

In the copending United States patent application No. 242,116, entitled, "Automatic Machine and Method," of which I am a coinventor, a novel automatic bead setting apparatus is disclosed and claimed as part of an automatic tire carcass building machine. Reference is specifically made herein to said copending application for a more complete disclosure of the complete environment in which the instant invention functions.

In the apparatus and method of said copending application generally cylindrical ply bands are formed on a succession of non-expansible, non-collapsible drums, the ends of the ply band extending beyond the ends of the drums. Each end of each drum bearing each said ply band is then sequentially presented axially to one of two automatic bead setters. While each ply band is oriented coaxially with one of said automatic bead setters, a sub-assembly thereof including an annular drum-like support member having mounted thereon a plurality of radially extensible fingers is inserted within the extended end of said ply band at a predetermined axial location. Substantially simultaneously, a bead held by suitable means is positioned coaxial with and encircling said ply band in a position opposed to said extensible fingers. The fingers are then extended radially to set the bead against the ply band and to hold said bead with said ply band interposed while the ply ends of said band are enfolded about said bead in a subsequent operational step of said automatic bead setter. It is important to note that, in the operation of such an automatic bead setter, the ply band is radially extended into set relationship with the radially interior surface of the bead, the ply band being gripped between the fingers and the bead, and the end of said ply band extending beyond the bead and the fingers over and spaced from the annular support member upon which said fingers are operably mounted.

The apparatus of this invention comprises an inflatable annular bladder of novel construction which is mounted on said annular support member so that its "forward" face will lie closely adjacent said fingers and the bead gripped thereby. In its uninflated condition this bladder has a flattened shape and is insertable, with said annular support member within and radially spaced from the extending end of the ply band. It is the function of this bladder, in cooperation with a coaxially reciprocable cylindrical cage located exterior to said bladder, said extending ply band end and said bead to smoothly enfold the ply band end about the bead and to adhere or stitch said ply band end to the outer lateral surface of said ply band while said bead and said ply band are held in set relationship by said fingers.

Accordingly, then, it is an object of this invention to provide a new and improved ply turn-up bladder construction.

It is a further object of this invention to provide a bladder suitable for the turn-up of a ply band end about a bead set by its radially interior surface against said ply band.

It is a still further object of this invention to provide a novel construction for the type of bladder disclosed possessing greater resistance to failure than previously known constructions.

Other and further objects and advantages of this invention will become apparent to those skilled in the art from the following description when read in conjunction with the appended claims and the accompanying drawings, in which:

FIG. 1 is a view of the bladder of this invention taken from the "rear" end thereof, that is, the end operationally disposed most remote from the drum bearing the ply band;

FIG. 2 is an axial cross-sectional view taken along line 2—2 of FIG. 1;

FIG. 3 is a diagrammatic view of a portion of the pneumatic system used for inflation of the bladder;

FIGS. 4, 5 and 6 are partially schematic sectional views of portions of the bladder and cooperating apparatus showing, sequentially, three steps in the functioning of the apparatus of this invention;

FIG. 7 is a sectional view of part of the bead region of a tire carcass showing a defect of carcass construction resulting from the employment of a construction different than that of this invention;

FIG. 8 is a sectional view of part of the bead region of a tire carcass of "ideal" construction made with the apparatus and method of this invention.

Referring now to the drawings, in which like reference numerals are used to designate the same parts throughout the several views, and more particularly to FIGS. 1 and 2, the details of construction of a preferred form of the bladder 10 will be described. As shown in these figures, the bladder 10 is constructed in the form of an annular flattened tube provided with two inlets 11, disposed 180° apart, for pressurized air. The annular tube is comprised of a layer of soft resilient rubber 12. Bonded to this layer of rubber 12 on the exterior surface thereof throughout most of its cross-sectional periphery is a layer of rubber-coated reinforcing fabric 13, said fabric being substantially inextensible in a plane including the axis of the bladder, but stretchable in a plane perpendicular to the said axis. This layer of fabric 13, which, in a preferred bladder construction is .040" thick, completely surrounds the axial cross-sectional periphery of the bladder 10 except for an extensible region of the cross-sectional periphery thereof including the face of the bladder at the forward end thereof, that is, the end nearest the radially extensible fingers when the bladder is mounted on the aforementioned annular member of the bead setter, and approximately 1¼" of the outer exterior surface of the bladder immediately adjacent thereto. The rubber layer 12 is approximately .060″ thick in the regions where it is reinforced by the fabric layer 13, and this thickness is increased to .120″ in the extensible non-reinforced region 12′. A suitable, relatively thick ring of rubber 14 is provided internally at the forward end of the bladder to anchor the bladder relative to the support member 17 without inhibiting any of the required bladder motions to be described below. Also, suitable rubber plugs 15 are provided at the inlets 11 of the bladder 10.

Referring now particularly to FIG. 4, it will be seen that the bladder 10 may be operationally mounted on an axially reciprocable annular support member 17 of the automatic bead setter, the inlet plugs 15 being inserted into suitable air inlet recesses 18 therein, and the rubber ring 14 at the forward end of the bladder 10 being firmly seated in an annular mounting recess 19 near the forward end of the annular support member 17 closely adjacent the radially extensible fingers 20. An air conduit 21 is connected to a passage 21′, in the annular member 17 to supply pressurized air for inflation of the bladder 10. A cylindrical cage 23 surrounds the annular member 17 and the bladder 10, said cage 23 being coaxial with the annular member 17 and independently axially reciprocable with respect thereto.

Referring now particularly to FIG. 3, pressurized air for inflation of the bladder 10 is supplied from a conventional source thereof, including, for instance, a compressor, accumulator and pressure regulator, to a conduit 25. Interposed between the supply conduit 25 and the conduits 21 feeding the bladder 10 is a two position solenoid actuated valve 26 permitting, alternatively either inflation or deflation of the bladder 10. Communicating with the conduits 21 is a pressure relief valve 27 for bleeding off excess air when the volume of the bladder 10 is constricted during the turn-up operation while the valve 26 is in the "inflation position."

Referring now again particularly to FIG. 4, the bladder 10, together with those components of the automatic bead setter to which it is assembled and with which it cooperates, is shown in operational position, lying partially within and spaced from the end 30 of a ply band 29 on which a bead 31 has already been set, the bead 31 being held in position by the radially extensible fingers 20 of the bead setter with the ply band 29 interposed therebetween, and the radially interior surface 31′ of the bead 30 being in contact with the ply band 29. The ply band 29, the bead 31, the bladder 10 and its cooperating bead setter elements are now (as shown in FIG. 4) formed and positioned appropriately for the ply turn-up operation to begin. For a detailed description of how the bead 31 may be set and the ply band 29 formed as shown in FIG. 4 and additional apparatus components suitable for accomplishing this purpose reference is had to the aforementioned copending application of which I am a coinventor.

Commencing then, with particular reference to FIGS. 3, 4, 5 and 6, the description of the functioning of bladder 10 and the bead setter elements cooperating therewith in enfolding the end 30 of the ply band 29 about the bead 31 and adhering said end 30 to said band 29, the solenoid 26a is actuated by manually operated or automatic electrical means thereby moving the valve 26 to inflation position to admit pressurized air to the bladder 10. As the bladder 10 begins to inflate it contacts the inner surface of the ply band end 30 which overlies the extensible region 12′ of the bladder 10, said ply band end 30 and said extensible region 12′ remaining in frictional contact during the remainder of the inflation of the bladder. As the bladder 10 then further inflates towards its completely inflated condition as shown in FIG. 5, the extensible region 12′ of the bladder 10 extends the ply band end 30 in a radial direction placing the end 30 in contact with the axial face of the bead 31 nearest the bladder 10. Simultaneously, the remainder of the ply band end 30 is radially tensioned and stretched taut as the end 30 and the bladder 10 are, ultimately, shaped to contact the interior of cage 23 and lock against it as shown in FIG. 5, whereby the extensible portion 12′ of bladder 10 applies tension to stretch ply band end 30 smoothly against the bead 31. In this position the ply band end 30 also serves to reinforce the extensible region 12′ of the bladder 10, restraining it from uncontrolled expansion. At this point in the sequence of operation of the apparatus the pressure within the bladder 10 is in equilibrium with the pressurized air supply.

Next, without any appreciable extension or stretching of any portion of the bladder 10 or the ply band end 30, but without relaxation of the tension on the end 30, the cage 23 is moved forward over the drum 35 and ply band 29 smoothly rolling the bladder 10 and the ply band end 30 into the position shown in FIG. 6 thereby enfolding the end 30 about the bead 31 and adhering it to the ply band 29 by virtue of the adhesive nature of tire carcass fabric. Any rise in pressure occasioned by the decrease in volume of the bladder 10 accompanying this forward motion by the cage 23 is relieved by the pressure relief valve 27. The cage 23 may then be rolled rearward leaving the bead 31 uniformly enfolded in the bead region of the carcass 32. Deflation of the bladder 10 may be initiated during the rearward motion of the cage 23 by deactuation of the solenoid 26a to move the valve 26 to deflation position.

The method employing this invention is, then, especially suited to the enfolding of the end of a ply band about a bead set by its radially interior surface to the outer surface of said ply band with the end of said ply band extending beyond said bead. The first step of said method is to turn said ply band end radially outward about said bead and place it in contact with the axial face thereof oriented toward said end. The next step of said method is to apply radial tension to said end of said ply band. Then said ply band end is caused to enfold said bead while tension is maintained, adhering said end to the outer surface of said band. Finally, the tension on said end is relieved.

One of the principal functions of the exterior substantially inextensible fabric reinforcement 13 of the bladder 10 is to strengthen the bladder 10 against failure due to tension. flexing, fatigue, creep and/or wear. It should be noted from FIGS. 4, 5 and 6 that those parts of the cross-sectional periphery of the bladder 10 contacting the cage 23 and the annular member 17 and which are, therefore, subject to the greatest amount of wear are so reinforced. Also, the part of the bladder periphery which is so reinforced is not subject to any appreciable axial stretching and, therefore, is not as subject to failure by tension or flexure or, after repeated cycles of inflation, to failure by creep and/or fatigue, as a more extensible bladder wall would be. The above-mentioned reinforcement of the extensible region 12′ of the bladder 10 by the ply band end 30 at times of maximum inflation pressure accomplishes essentially the same strengthening of the extensible region 12′ of the bladder 10.

It should be appreciated that, in the method of forming the bead region of a tire carcass described herein, no advantage is to be gained by providing a bladder extensible to a greater or lesser degree throughout its axial cross-sectional periphery. It is, however, essential that the portion of the bladder 10 to be positioned inside the ply band end 30 and axially immediately adjacent to the bead 31 (as shown herein, the forward end of the bladder 10) be extensible so that the end 30 can be radially tensioned as it is turned up about the axially rearward face of the bead 31. Otherwise the end 30 of the ply band 29 is prone to wrinkle as it is enfolded about the bead 31 producing the faulty bead region construction illustrated in FIG. 7 rather than the ideal construction shown in FIG. 8. However, by providing a substantially inextensible reinforcement 13 for most of the periphery of the bladder 10 and by virtue of the remaining extensible portion 12' of the bladder 10 being substantially reinforced by the ply band end 30, higher pneumatic pressure can be utilized in the bladder assuring a better stitching action in adhering the end 30 to the band 29 without appreciable risk of blowout of the bladder, thereby avoiding the disadvantages of a bladder extensible throughout the axial cross-sectional periphery.

It will be understood that a number of variations may be made in the present invention without departure from the spirit thereof and from the scope of the appended claims.

Having thus described my invention, what I claim and desire to secure by Letters Patent is:

1. An inflatable annular bladder for use in an apparatus for forming a bead region of a tire carcass from a ply band having the radially interior surface of a bead in contact with the outer surface of said band, the end of said band extending beyond said bead, said apparatus including a bladder support member having a generally cylindrical outer surface on which said bladder is adapted to be operationally mounted and a cage member having a generally cylindrical inner surface surrounding said support member and radially spaced therefrom to form an annular aperture to receive said extending ply band end exterior of said bladder when said bladder is uninflated, said cage member being axially displaceable with respect to said support member, said bladder comprising:
   (a) an air impervious extensible wall portion forming the axial face of said bladder for disposition axially adjacent said bead, said wall portion also forming a relatively narrow annular portion of the radially outermost wall of said bladder contiguous to said face; and
   (b) a reinforced air impervious wall portion adjacent to said extensible wall portion and forming the remainder of the bladder wall, said reinforced wall portion being substantially inextensible in a plane including the axis of the bladder.

2. An inflatable annular bladder for use in an apparatus form forming a bead region of a tire carcass from a ply band having the radially interior surface of a bead in contact with the outer surface of said band, the end of said band extending beyond said bead, said apparatus including a bladder support member having a generally cylindrical outer surface on which said bladder is adapted to be operationally mounted and a cage member having a generally cylindrical inner surface surrounding said support member and radially spaced therefrom to form an annular aperture to receive said extending ply band end exterior of said bladder when said bladder is uninflated, said cage member being axially displaceable with respect to said support member, said bladder comprising:
   (a) an air impervious extensible wall portion forming the axial face of said bladder for disposition axially adjacent said bead, said wall portion also form a relatively narrow annular portion of the radially outermost wall of said bladder contiguous to said face;
   (b) a reinforced air impervious wall portion joined to said extensible wall portion and forming the remainder of the bladder wall, said reinforced wall portion being substantially inextensible in a plane including the axis of the bladder; and
   (c) means for securing the radially innermost wall portion of said bladder contiguous with said face to said bladder support member.

3. An inflatable flattened annular bladder for use in an apparatus for forming a bead region of a tire carcass from a ply band having the radially interior surface of a bead in contact with the outer surface of said band, the end of said band extending beyond said bead, said apparatus including a bladder support member having a generally cylindrical outer surface on which said bladder is adapted to be operationally mounted and a cage member having a generally cylindrical inner surface surrounding said support member and radially spaced therefrom to form an annular aperture to receive said extending ply band end exterior of said bladder when said bladder is uninflated, said cage member being axially displaceable with respect to said support member, said bladder comprising:
   (a) an air impervious extensible wall portion forming the axial face of said bladder for disposition axially adjacent said bead, said wall portion also forming a relatively narrow annular portion of the radially outermost wall of said bladder contiguous to said face; and
   (b) an air impervious wall portion, reinforced by a fabric layer bonded thereto, joined to said extensible wall portion and forming the remainder of the bladder wall, said reinforced wall portion being substantially inextensible in a plane including the axis of the bladder, but readily extensible in a direction normal thereto.

4. On inflatable flattened annular bladder for use in an apparatus for forming a bead region of a tire carcass from a ply band having the radially interior surface of a bead in contact with the outer surface of said band, the end of said band extending beyond said bead, said apparatus including a bladder support member having a generally cylindrical outer surface on which said bladder is adapted to be operationally mounted and a cage member having a generally cylindrical inner surface surrounding said support member and radially spaced therefrom to form an annular aperture to receive said extending ply band end exterior of said bladder when said bladder is uninflated, said cage member being axially bladder comprising:
   (a) an air impervious extensible wall portion forming the axial face of said bladder for disposition axially adjacent to said bead, said wall portion also forming relatively narrow annular portion of the radially outermost wall of said bladder contiguous to said face;
   (b) an air impervious wall portion, reinforced by a fabric layer bonded thereto, joined to said extensible wall portion and forming the remainder of the bladder wall, said reinforced wall portion being substantially inextensible in a plane including the axis of the bladder, but readily extensible in the direction normal thereto; and
   (c) means, including a thickened rubber ring, for securing the radially innermost wall of said bladder contiguous with said face to said bladder support member.

5. An inflatable flattened annular bladder for use in an apparatus for forming a bead region of a tire carcass from a ply band having the radially interior surface of a bead in contact with the outer surface of said band, the end of said band extending beyond said bead, said apparatus including a bladder support member having a generally cylindrical outer surface on which said bladder is adapted to be operationally mounted and a cage member having a generally cylindrical inner surface surrounding said support member and radially spaced therefrom to form an annular aperture to receive said extending ply band end exterior of said bladder when said bladder is uninflated, said cage member being axially displaceable with respect to said support member, said bladder comprising:
   (a) layer of extensible air impervious material enclosing the entire inflatable space within said bladder;
   (b) a layer of reinforcing material adhered to most of the outer surface of said air impervious layer, said reinforcing layer being substantially inextensible in a plane including the axis of the bladder;

(c) an area of said air impervious layer, including the axial face of the bladder adapted to be operationally disposed axially adjacent to said bead and an annular area of the radially outermost surface of said bladder contiguous with said face, being free of said reinforcing layer.

6. An inflatable flattened annular bladder for use in an apparatus for forming a bead region of a tire carcass from a ply band having the radially interior surface of a bead in contact with the outer surface of said band, the end of said band extending beyond said bead, said apparatus including a bladder support member having a generally cylindrical outer surface on which said bladder is adapted to be operationaly mounted and a cage member having a generally cylindrical inner surface surrounding said support member and radially spaced therefrom to form an annular aperture to receive said extending ply band end exterior of said bladder when said bladder is uninflated, said cage member being axially displaceable with respect to said support member, said bladder comprising:

(a) a layer of soft resilient cured rubber enclosing the entire inflatable space within said bladder;
(b) a layer of reinforcing fabric adhered to most of the outer surface of said air impervious layer, said reinforcing fabric being substantially inextensible in a plane including the axis of the bladder, but readily extensible in a direction normal thereto;
(c) an area of said rubber layer, including the axial face of the bladder adapted to be operationally disposed axially adjacent to said bead and an annular area of the radially outermost surface of said bladder contiguous with said face, being free of said reinforcing fabric.

7. An inflatable flattened annular bladder for use in an apparatus for forming a bead region of a tire carcass from a ply band having the radially interior surface of a bead in contact with the outer surface of said band, the end of said band extending beyond said bead, said apparatus including a bladder support member having a generally cylindrical outer surface on which said bladder is adapted to be operationally mounted and a cage member having a generally cylindrical inner surface surrounding said support member and radially spaced therefrom to form an annular aperture to receive said extending ply band end exterior of said bladder when said bladder is uninflated, said cage member being axially displaceable with respect to said support member, said bladder comprising:

(a) a layer of soft resilient cured rubber enclosing the entire inflatable space within said bladder;
(b) a layer of reinforcing fabric adhered to most of the outer surface of said rubber layer, said reinforcing fabric being substantially inextensible in a plane including the axis of the bladder, but readily extensible in a direction normal thereto;
(c) an annular area of said rubber layer, including the axial face of the bladder adapted to be operationally disposed axially adjacent to said bead and a length of the radially outermost surface of said bladder contiguous with said face and not as long as said extending ply end, being free of said reinforcing layer.

8. In bead-setting apparatus having a first member with a generally cylindrical outer surface and a second member with a generally cylindrical inner surface surrounding the first member and forming therewith an annular aperture between the surfaces, the second member being axially displaceable with respect to the first member, an inflatable bladder comprising:

an inflatable resilient annular member of stretchable elastomeric material adapted for disposition in the annular aperture of the bead-setting apparatus and a reinforcing member adhered to said inflatable member over that portion of the outer surface thereof which is adapted for contact with the generally cylindrical surfaces of the bead-setting apparatus, said reinforcing member being substantially unstretchable axially of said inflatable member, and said inflatable member having an unreinforced end region adapted for expansion while forming a tire carcass ply over a tire bead.

References Cited by the Examiner

UNITED STATES PATENTS

| | | | |
|---|---|---|---|
| 2,565,071 | 8/1951 | Frazier | 156—401 |
| 2,567,064 | 9/1951 | Frazier | 156—132 |
| 2,951,526 | 9/1960 | Haase | 156—401 |
| 3,044,533 | 7/1962 | Lowe | 156—401 |
| 3,101,289 | 8/1963 | Giletta et al. | 156—401 |
| 3,111,443 | 11/1963 | Vanzo et al. | 156—401 |
| 3,127,294 | 3/1964 | Porter | 156—401 |

FOREIGN PATENTS

| | | |
|---|---|---|
| 626,948 | 9/1961 | Canada. |
| 628,624 | 10/1961 | Canada. |
| 631,116 | 11/1961 | Canada. |
| 631,131 | 11/1961 | Canada. |

EARL M. BERGERT, *Primary Examiner.*

HAROLD ANSHER, ALEXANDER WYMAN, JOSEPH REBOLD, *Examiners.*